(12) United States Patent
Lin et al.

(10) Patent No.: US 9,350,512 B2
(45) Date of Patent: May 24, 2016

(54) METHOD FOR ACTIVATING MULTIPLE STREAMS TRANSMISSION UE TO TRANSMIT HS-DPCCH AND UE THEREOF

(75) Inventors: Shugong Lin, Shenzhen (CN); Junqiang Liu, Shenzhen (CN); Xiang Cheng, Shenzhen (CN); Ruifeng Li, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 46 days.

(21) Appl. No.: 14/348,069

(22) PCT Filed: Jul. 11, 2012

(86) PCT No.: PCT/CN2012/078479
§ 371 (c)(1),
(2), (4) Date: Mar. 28, 2014

(87) PCT Pub. No.: WO2013/044667
PCT Pub. Date: Apr. 4, 2013

(65) Prior Publication Data
US 2014/0241329 A1    Aug. 28, 2014

(30) Foreign Application Priority Data
Sep. 30, 2011   (CN) .......................... 2011 1 0293981

(51) Int. Cl.
*H04L 5/00* (2006.01)
*H04W 76/02* (2009.01)
(Continued)

(52) U.S. Cl.
CPC ................ *H04L 5/0055* (2013.01); *H04L 1/00* (2013.01); *H04L 1/0026* (2013.01);
(Continued)

(58) Field of Classification Search
CPC .................................................... H04L 5/0055
See application file for complete search history.

(56) References Cited

U.S. PATENT DOCUMENTS

2008/0225966 A1* 9/2008 Tseng ............... H04W 72/1289
375/260
2009/0196247 A1 8/2009 Fan et al.
(Continued)

FOREIGN PATENT DOCUMENTS

| CN | 101686491 | 3/2010 |
| CN | 101931508 | 12/2010 |
| CN | 101932109 | 12/2010 |

OTHER PUBLICATIONS

3GPP TS 25.211 v10.0.0 (Sep. 2010), 3rd Generation Partnership Projrct; Technical Spesification Group Radio Access Network; Physical channels and mapping of transport channels onto physical channels (FDD) (Release 10), pp. 1-58.*
(Continued)

*Primary Examiner* — Brian D Nguyen
*Assistant Examiner* — Toan Nguyen
(74) *Attorney, Agent, or Firm* — Plumsea Law Group, LLC

(57) ABSTRACT

The present document provides a method for a User Equipment (UE) which activates multi-stream transmission to transmit a High Speed Dedicated Physical Control Channel (HS-DPCCH) and a UE thereof, wherein the method is applied in a multi-stream transmission system, and includes: after receiving High-Speed Physical Downlink Shared Channel (HS-PDSCH) subframes transmitted from primary and secondary serving cells, the UE which activates the multi-stream transmission transmitting a HS-DPCCH carrying jointly encoded Acknowledge/Negative Acknowledgement (ACK/NACK) and Channel Quality Indicator (CQI) after a predetermined duration by taking a later received HS-PDSCH subframe of the pair of paired HS-PDSCH subframes as a reference, wherein the predetermined duration is determined according to a timing correlation by which the UE transmits the HS-DPCCH subframe and correspondingly receives the HS-PDSCH subframe, which is specified in the $3^{rd}$ Generation Partnership Project (3GPP) specification 25.211.

11 Claims, 13 Drawing Sheets

(51) Int. Cl.
*H04L 1/00* (2006.01)
*H04L 1/16* (2006.01)
*H04L 1/18* (2006.01)
*H04W 88/02* (2009.01)

(52) U.S. Cl.
CPC ........... *H04L 1/1671* (2013.01); *H04L 1/1822* (2013.01); *H04L 5/0057* (2013.01); *H04W 76/025* (2013.01); *H04W 88/02* (2013.01)

(56) References Cited

U.S. PATENT DOCUMENTS

2009/0245212 A1* 10/2009 Sambhwani .......... H04L 1/1671
370/336
2010/0142456 A1* 6/2010 Lee ................... H04W 52/0216
370/329
2011/0110239 A1* 5/2011 Blanz ..................... H04B 7/024
370/241
2011/0249656 A1* 10/2011 Cai ....................... H04L 1/0028
370/336

OTHER PUBLICATIONS

Qualcomm Incorporated, TP on Impact to RAN specifications due to HSDAPA MP-TX, R1-112688, Aug. 22-26 2011.
3GPP, 3rd Generation Partnership Project; Technical Specification Group Radio Access Network; Physical channels and mapping of transport channels onto physical channels (FDD)(Release 10), 3GPP TS 25.211, Sep. 2010.
Nokia Siemens Networks, HS-SFN performance evaluation, R1-111052, Feb. 21-25, 2011.
Qualcomm Incorporated et al., Simulation Framework for System Evaluation of Multi-Point HSDPA, R1-110563, Jan. 17-21, 2011.
Extended European Search Report dated Jan. 7, 2016 in European Patent Application No. 12837080.6.

* cited by examiner

| | Subframe 0 | Subframe 1 | Subframe 2 | Subframe 3 | Subframe 4 | Subframe 5 | Subframe 6 | Subframe 7 | Subframe 8 | Subframe 9 | Subframe 10 | Subframe 11 | Subframe 12 | Subframe 13 |
|---|---|---|---|---|---|---|---|---|---|---|---|---|---|---|
| HARQ 1 | Scheduled | Unsch-eduled | Unsch-eduled | Unsch-eduled | Unsch-eduled | Unsch-eduled | Unsch-eduled | Scheduled | Unsch-eduled | Unsch-eduled | Unsch-eduled | Unsch-eduled | Unsch-eduled | Unsch-eduled |
| HARQ 2 | Unsch-eduled | Scheduled | Unsch-eduled | Unsch-eduled | Unsch-eduled | Unsch-eduled | Unsch-eduled | Unsch-eduled | Scheduled | Unsch-eduled | Unsch-eduled | Unsch-eduled | Unsch-eduled | Unsch-eduled |
| HARQ 3 | Unsch-eduled | Unsch-eduled | Scheduled | Unsch-eduled | Unsch-eduled | Unsch-eduled | Unsch-eduled | Unsch-eduled | Unsch-eduled | Scheduled | Unsch-eduled | Unsch-eduled | Unsch-eduled | Unsch-eduled |
| HARQ 4 | Unsch-eduled | Unsch-eduled | Unsch-eduled | Scheduled | Unsch-eduled | Unsch-eduled | Unsch-eduled | Unsch-eduled | Unsch-eduled | Unsch-eduled | Scheduled | Unsch-eduled | Unsch-eduled | Unsch-eduled |
| HARQ 5 | Unsch-eduled | Unsch-eduled | Unsch-eduled | Unsch-eduled | Scheduled | Unsch-eduled | Unsch-eduled | Unsch-eduled | Unsch-eduled | Unsch-eduled | Unsch-eduled | Scheduled | Unsch-eduled | Unsch-eduled |
| HARQ 6 | Unsch-eduled | Unsch-eduled | Unsch-eduled | Unsch-eduled | Unsch-eduled | Scheduled | Unsch-eduled | Unsch-eduled | Unsch-eduled | Unsch-eduled | Unsch-eduled | Unsch-eduled | Scheduled | Unsch-eduled |

FIG. 8

|  | Subframe 0 | Subframe 1 | Subframe 2 | Subframe 3 | Subframe 4 | Subframe 5 | Subframe 6 | Subframe 7 | Subframe 8 | Subframe 9 | Subframe 10 | Subframe 11 | Subframe 12 | Subframe 13 |
|---|---|---|---|---|---|---|---|---|---|---|---|---|---|---|
| HARQ 1 | Scheduled | Unsch-eduled | Unsch-eduled | Unsch-eduled | Unsch-eduled | Unsch-eduled | Scheduled | Unsch-eduled | Unsch-eduled | Unsch-eduled | Unsch-eduled | Unsch-eduled | Scheduled | Unsch-eduled |
| HARQ 2 | Unsch-eduled | Scheduled | Unsch-eduled | Unsch-eduled | Unsch-eduled | Unsch-eduled | Unsch-eduled | Scheduled | Unsch-eduled | Unsch-eduled | Unsch-eduled | Unsch-eduled | Unsch-eduled | Scheduled |
| HARQ 3 | Unsch-eduled | Unsch-eduled | Scheduled | Unsch-eduled | Unsch-eduled | Unsch-eduled | Unsch-eduled | Unsch-eduled | Scheduled | Unsch-eduled | Unsch-eduled | Unsch-eduled | Unsch-eduled | Unsch-eduled |
| HARQ 4 | Unsch-eduled | Unsch-eduled | Unsch-eduled | Scheduled | Unsch-eduled | Unsch-eduled | Unsch-eduled | Unsch-eduled | Unsch-eduled | Scheduled | Unsch-eduled | Unsch-eduled | Unsch-eduled | Unsch-eduled |
| HARQ 5 | Unsch-eduled | Unsch-eduled | Unsch-eduled | Unsch-eduled | Scheduled | Unsch-eduled | Unsch-eduled | Unsch-eduled | Unsch-eduled | Unsch-eduled | Scheduled | Unsch-eduled | Unsch-eduled | Unsch-eduled |
| HARQ 6 | Unsch-eduled | Unsch-eduled | Unsch-eduled | Unsch-eduled | Unsch-eduled | Scheduled | Unsch-eduled | Unsch-eduled | Unsch-eduled | Unsch-eduled | Unsch-eduled | Scheduled | Unsch-eduled | Unsch-eduled |

FIG. 9

| | Subframe 0 | Subframe 1 | Subframe 2 | Subframe 3 | Subframe 4 | Subframe 5 | Subframe 6 | Subframe 7 | Subframe 8 | Subframe 9 | Subframe 10 | Subframe 11 | Subframe 12 | Subframe 13 |
|---|---|---|---|---|---|---|---|---|---|---|---|---|---|---|
| HARQ 1 | Scheduled | Unscheduled | Unscheduled | Unscheduled | Unscheduled | Unscheduled | Unscheduled | Scheduled | Unscheduled | Unscheduled | Unscheduled | Unscheduled | Unscheduled | Unscheduled |
| HARQ 2 | Unscheduled | Scheduled | Unscheduled | Unscheduled | Unscheduled | Unscheduled | Unscheduled | Unscheduled | Scheduled | Unscheduled | Unscheduled | Unscheduled | Unscheduled | Unscheduled |
| HARQ 3 | Unscheduled | Unscheduled | Scheduled | Unscheduled | Unscheduled | Unscheduled | Unscheduled | Unscheduled | Unscheduled | Scheduled | Unscheduled | Unscheduled | Unscheduled | Unscheduled |
| HARQ 4 | Unscheduled | Unscheduled | Unscheduled | Scheduled | Unscheduled | Unscheduled | Unscheduled | Unscheduled | Unscheduled | Unscheduled | Scheduled | Unscheduled | Unscheduled | Unscheduled |
| HARQ 5 | Unscheduled | Unscheduled | Unscheduled | Unscheduled | Scheduled | Unscheduled | Unscheduled | Unscheduled | Unscheduled | Unscheduled | Unscheduled | Scheduled | Unscheduled | Unscheduled |
| HARQ 6 | Unscheduled | Unscheduled | Unscheduled | Unscheduled | Unscheduled | Scheduled | Unscheduled | Unscheduled | Unscheduled | Unscheduled | Unscheduled | Unscheduled | Scheduled | Unscheduled |
| HARQ 7 | Unscheduled | Unscheduled | Unscheduled | Unscheduled | Unscheduled | Unscheduled | Scheduled | Unscheduled | Unscheduled | Unscheduled | Unscheduled | Unscheduled | Unscheduled | Scheduled |

FIG. 10

| | Subframe 0 | Subframe 1 | Subframe 2 | Subframe 3 | Subframe 4 | Subframe 5 | Subframe 6 | Subframe 7 | Subframe 8 | Subframe 9 | Subframe 10 | Subframe 11 | Subframe 12 | Subframe 13 |
|---|---|---|---|---|---|---|---|---|---|---|---|---|---|---|
| HARQ 1 | Scheduled | Unsch-eduled | Unsch-eduled | Unsch-eduled | Unsch-eduled | Unsch-eduled | Scheduled | Unsch-eduled | Unsch-eduled | Unsch-eduled | Unsch-eduled | Unsch-eduled | Scheduled | Unsch-eduled |
| HARQ 2 | Unsch-eduled | Scheduled | Unsch-eduled | Unsch-eduled | Unsch-eduled | Unsch-eduled | Unsch-eduled | Scheduled | Unsch-eduled | Unsch-eduled | Unsch-eduled | Unsch-eduled | Unsch-eduled | Scheduled |
| HARQ 3 | Unsch-eduled | Unsch-eduled | Scheduled | Unsch-eduled | Unsch-eduled | Unsch-eduled | Unsch-eduled | Unsch-eduled | Scheduled | Unsch-eduled | Unsch-eduled | Unsch-eduled | Unsch-eduled | Unsch-eduled |
| HARQ 4 | Unsch-eduled | Unsch-eduled | Unsch-eduled | Scheduled | Unsch-eduled | Unsch-eduled | Unsch-eduled | Unsch-eduled | Unsch-eduled | Scheduled | Unsch-eduled | Unsch-eduled | Unsch-eduled | Unsch-eduled |
| HARQ 5 | Unsch-eduled | Unsch-eduled | Unsch-eduled | Unsch-eduled | Scheduled | Unsch-eduled | Unsch-eduled | Unsch-eduled | Unsch-eduled | Unsch-eduled | Scheduled | Unsch-eduled | Unsch-eduled | Unsch-eduled |
| HARQ 6 | Unsch-eduled | Unsch-eduled | Unsch-eduled | Unsch-eduled | Unsch-eduled | Scheduled | Unsch-eduled | Unsch-eduled | Unsch-eduled | Unsch-eduled | Unsch-eduled | Scheduled | Unsch-eduled | Unsch-eduled |
| HARQ 7 | Unsch-eduled | Unsch-eduled | Unsch-eduled | Unsch-eduled | Unsch-eduled | Unsch-eduled | Unsch-eduled | Unsch-eduled | Unsch-eduled | Unsch-eduled | Unsch-eduled | Unsch-eduled | Unsch-eduled | Unsch-eduled |

FIG. 11A

| | Subframe 0 | Subframe 1 | Subframe 2 | Subframe 3 | Subframe 4 | Subframe 5 | Subframe 6 | Subframe 7 | Subframe 8 | Subframe 9 | Subframe 10 | Subframe 11 | Subframe 12 | Subframe 13 |
|---|---|---|---|---|---|---|---|---|---|---|---|---|---|---|
| HARQ 1 | Scheduled | Unscheduled | Unscheduled | Unscheduled | Unscheduled | Unscheduled | Unscheduled | Scheduled | Unscheduled | Unscheduled | Unscheduled | Unscheduled | Unscheduled | Unscheduled |
| HARQ 2 | Unscheduled | Scheduled | Unscheduled | Unscheduled | Unscheduled | Unscheduled | Unscheduled | Unscheduled | Scheduled | Unscheduled | Unscheduled | Unscheduled | Unscheduled | Unscheduled |
| HARQ 3 | Unscheduled | Unscheduled | Scheduled | Unscheduled | Unscheduled | Unscheduled | Unscheduled | Unscheduled | Unscheduled | Scheduled | Unscheduled | Unscheduled | Unscheduled | Unscheduled |
| HARQ 4 | Unscheduled | Unscheduled | Unscheduled | Scheduled | Unscheduled | Unscheduled | Unscheduled | Unscheduled | Unscheduled | Unscheduled | Scheduled | Unscheduled | Unscheduled | Unscheduled |
| HARQ 5 | Unscheduled | Unscheduled | Unscheduled | Unscheduled | Scheduled | Unscheduled | Unscheduled | Unscheduled | Unscheduled | Unscheduled | Unscheduled | Scheduled | Unscheduled | Unscheduled |
| HARQ 6 | Unscheduled | Unscheduled | Unscheduled | Unscheduled | Unscheduled | Scheduled | Unscheduled | Unscheduled | Unscheduled | Unscheduled | Unscheduled | Unscheduled | Scheduled | Unscheduled |
| HARQ 7 | Unscheduled | Unscheduled | Unscheduled | Unscheduled | Unscheduled | Unscheduled | Scheduled | Unscheduled | Unscheduled | Unscheduled | Unscheduled | Unscheduled | Unscheduled | Scheduled |

FIG.11B

METHOD FOR ACTIVATING MULTIPLE STREAMS TRANSMISSION UE TO TRANSMIT HS-DPCCH AND UE THEREOF

TECHNICAL FIELD

The present document relates to multi-stream transmission technologies in a mobile communication system, and in particular, to a method for a User Equipment (UE) which activates a multi-stream transmission to transmit HS-DPCCH and a UE thereof.

BACKGROUND OF THE RELATED ART

High Speed Downlink Link Packet Access (HSDPA for short) is a technique proposed by the $3^{rd}$ Generation Partnership Project (3GPP for short) in Release-5, which is used to improve network data throughput in the downlink direction (from the network to the terminal), and the cell and the single user downlink peak rate designed by it can reach 14.4 Mbps. Then, in order to make the downlink peak rate higher, a new technology, High Speed Packet Access Evolution (HSPA+) is introduced, these technologies include the downlink 64 Quadrature Amplitude Modulation (QAM) high-order modulation and Multiple Input Multiple Output (MIMO for short) antenna technology proposed in Release-7, the Double-carrier (DC) HSDPA technology proposed in the Release-8, the DC HSDPA+MIMO technology proposed in the Release-9, and the Four Carrier HSDPA (4C HSDPA) technology proposed in the Release-10. However, because the HSDPA does not support soft switching, in order to improve the user experience on the cell edge, the Release-11 starts to research on the multi-point transmission technology for Wideband Code Division Multiple Access (WCDMA) HSDPA. One multi-point transmission technology scheme therein is Single Frequency Dual Cell (SF-DC), which includes dual-data stream transmission scheme SF-DC Aggregation and single-data stream transmission scheme SF-DC Switching. The SF-DC Aggregation refers to two co-frequency cells (referred to as a primary serving cell and a secondary serving cell) using the HSDPA technology under the same NodeB or different NodeBs transmitting different data streams to the same UE in the same Transmission Time Interval (TTI), thereby improving the data throughput when the user is at the cell edge. The SF-DC Switching refers to selecting a cell with better signals from both co-frequency cells (referred to as a primary serving cell and a secondary serving cell) under the same NodeB to transmit a data stream to the UE. The SF-DC technology requires a user starting the SF-DC to monitor High Speed Shared Control Channel (HS-SCCH) of two co-frequency primary and secondary serving cells, and feeds back jointly encoded Acknowledgement/Negative Acknowledgement (ACK/NACK) and Channel Quality Indicator (CQI) indication to both co-frequency primary and secondary serving cells in the uplink direction, wherein the indication is transmitted in the High Speed Dedicated Physical Control Channel (HS-DPCCH). At present, the 3GPP specification 25.211 specifies occasions when the UE transmits the HS-DPCCH, that is, the HS-DPCCH channel is started to be transmitted about 7.5 slots (i.e., 19200 chips) after the UE receives the High-Speed Physical Downlink Shared Channel (HS-PDSCH), as shown in FIG. 1.

Since in the SF-DC system, there exists a frame offset in the downlink channels transmitted by the primary and secondary serving cells and the air broadcast delays of both cells are different, it results in that the UE receives the HS-PDSCH channel from the primary and secondary serving cells respectively at different times. According to the existing specification, the UE cannot transmit the jointly encoded ACK/NACK and CQI indication to the primary and secondary serving cells with different frame offsets at the same time. In order to enable the UE to transmit the ACK/NACK and CQI indication to both the primary and secondary serving cells of the SF-DC at the same time, the 3GPP is doing research on the following several schemes at present:

the first scheme is to compress the time during which the UE transmits the HS-DPCCH, that is, the UE can transmit the HS-DPCCH channel after 4.5 slots-7.5 slots after receiving the HS-PDSCH channel, and this scheme needs the network side to pair the HS-PDSCH subframes of the primary and secondary serving cells according to the frame timing offset of the primary and secondary serving cells reported by the UE, as shown in FIG. 2;

the second scheme is to compress the time during which the NodeB decodes and processes the HS-DPCCH, and this scheme also needs the network side to pair the HS-PDSCH subframes of the primary and secondary serving cells according to the frame timing offset of the primary and secondary serving cells reported by the UE, as shown in FIG. 3;

the third scheme is to equalize and compress the time during which the UE transmits the HS-DPCCH and compress the time during which the UE decodes and processes the HS-DPCCH, and this scheme also needs the network side to pair the HS-PDSCH subframes of the primary and secondary serving cells according to the frame timing offset of the primary and secondary serving cells reported by the UE, as shown in FIG. 4.

All above three schemes are based on solutions that, when the number of Hybrid Automatic Repeat Request (HARQ) processes of the UE is 6 per serving cell and the UE which activates the multi-stream transmission needs to be scheduled every TTI. While the number of HARQ processes of the UE which is specified by the specification can be 1-8 per serving cell, and when the number of HARQ processes is not 6 per serving cell, the above three schemes have no application value. In addition, when the UE which activates the multi-stream transmission needs not to be scheduled every TTI, the above three schemes also have no application value. Meanwhile, all above various schemes have a large influence on the hardware of the terminal or the NodeB, thereby increasing the implementation cost. If the first scheme or the third scheme is used, there will also exist a relatively large influence on the existing specification.

SUMMARY OF THE INVENTION

The technical problem to be solved by the embodiments of the present document is to provide a method for a UE which activates a multi-stream transmission to transmit an HS-DPCCH and a UE thereof, to overcome the defect of a large influence of the existing method for transmitting the HS-DPCCH on the existing system.

In order to solve the above problem, the embodiments of the present document provide a method for a UE which activates a multi-stream transmission to transmit an HS-DPCCH, which is applied in a multi-stream transmission system, comprising:

after receiving HS-PDSCH subframes transmitted by primary and secondary serving cells, the UE, which activates the multi-stream transmission, transmitting an HS-DPCCH carrying jointly encoded ACK/NACK and CQI after a predetermined duration by taking a later received HS-PDSCH subframe of a pair of paired HS-PDSCH subframes as a reference, wherein the predetermined duration is determined according to a timing correlation by which the UE transmits the HS-DPCCH subframe and correspondingly receives the HS-PDSCH subframe, which is specified in the 3GPP specification 25.211.

Alternatively, the method further comprises:

before transmitting the HS-DPCCH, the UE reporting measured frame timing information of the primary and secondary serving cells to a Radio Network Controller (RNC); and the UE receiving a pairing result obtained after the RNC pairs the HS-PDSCH subframe transmitted by the primary serving cell and the HS-PDSCH subframe transmitted by the secondary serving cell, wherein, the pairing result is obtained by the RNC according to received frame timing information of the primary and secondary serving cells which is reported by the UE.

Alternatively, the pairing result is also transmitted to NodeBs corresponding to the primary and secondary serving cells.

Alternatively, the jointly encoded ACK/NACK is obtained after the UE jointly encodes the ACKs/NACKs corresponding to all subframes in a pair of paired HS-PDSCH subframes according to the received pairing result; and the jointly encoded CQI is obtained after the UE jointly encodes the CQIs corresponding to the primary and secondary serving cells.

Alternatively, the HS-PDSCH subframe transmitted by the primary serving cell and the HS-PDSCH subframe transmitted by the secondary serving cell with a time offset being in a range of one subframe duration are paired.

Alternatively, the method further comprises:

when the UE has activated the multi-stream transmission function, both numbers of HARQ processes of the UE in the primary and secondary serving cells are configured by the RNC to be greater than 6, or a number of HARQ processes of the UE in a serving cell corresponding to a earlier received HS-PDSCH subframe in a pair of paired HS-PDSCH subframes is configured by the RNC to be greater than 6.

Alternatively, the method further comprises:

when the UE deactivates the multi-stream transmission function, the number of HARQ processes of the UE in the current serving cell is reconfigured by the RNC to be less than 7.

Alternatively, the method further comprises:

when the UE does not activate the multi-stream transmission function, the number of HARQ processes of the UE in the current serving cell is configured by the RNC to be less than 7.

Correspondingly, the embodiments of the present document further disclose a UE, comprising:

a receiving module, configured to receive HS-PDSCH subframes transmitted by primary and secondary serving cells when the UE activates a multi-stream transmission; and a transmitting module, configured to transmit an HS-DPCCH carrying jointly encoded ACK/NACK and CQI after a predetermined duration by taking a later received HS-PDSCH subframe of a pair of paired HS-PDSCH subframes as a reference, wherein the predetermined duration is determined according to a timing correlation by which the UE transmits the HS-DPCCH subframe and correspondingly receives the HS-PDSCH subframe, which is specified in the 3GPP specification 25.211.

Alternatively, the UE further comprises:

a measurement reporting module, configured to report measured frame timing information of the primary and secondary serving cells to an RNC before the transmitting module transmits the HS-DPCCH; and the receiving module is further configured to receive a pairing result sent by the RNC, which is obtained after pairing the HS-PDSCH subframe transmitted by the primary serving cell and the HS-PDSCH subframe transmitted by the secondary serving cell, wherein, the pairing result is obtained by the RNC according to received frame timing information of the primary and secondary serving cells which is reported by the measurement reporting module.

Alternatively, the UE further comprises:

an encoding module, configured to:

obtain the jointly encoded ACK/NACK by jointly encoding the ACKs/NACKs corresponding to all subframes in a pair of paired HS-PDSCH subframes according to the received pairing result; and obtain the jointly encoded CQI after jointly encoding the CQIs corresponding to the primary and secondary serving cells.

On the premise of reusing the existing specification and having small modifications to the design of the UE, the embodiments of the present document solve the problem of the UE generating the ACK/NACK indication in the multi-stream transmission system, thus reducing the complexity of the design of the network system and the terminal, especially, reducing the implementation costs of the network system and the terminal.

BRIEF DESCRIPTION OF DRAWINGS

FIG. 8 is a diagram of a primary serving cell scheduling a multi-stream transmission UE when there are 6 HARQ processes of the UE in the diagram of FIG. 7 of the present document;

FIG. 9 is a diagram of a secondary serving cell scheduling a multi-stream transmission UE when there are 6 HARQ processes of the UE in the diagram of FIG. 7 of the present document;

FIG. 10 is a diagram of a primary serving cell scheduling a multi-stream transmission UE when there are 7 HARQ processes of the UE in the diagram of FIG. 7 of the present document;

FIGS. 11A and 11B are diagrams of a secondary serving cell scheduling a multi-stream transmission UE when there are 7 HARQ processes of the UE in the diagram of FIG. 7 of the present document;

PREFERRED EMBODIMENTS OF THE INVENTION

The embodiments of the present document will be described in detail hereinafter in conjunction with accompanying drawings. It should be illustrated that, in the case of no conflict, the embodiments in the present application and the features in the embodiments can be combined with each other randomly.

In the present embodiment, a method for a UE which activates a multi-stream transmission to transmit an HS-DPCCH, which is used in multi-stream transmission system, comprises: after receiving HS-PDSCH subframes transmitted by primary and secondary service cells, the UE which activates the multi-stream transmission transmitting an HS-DPCCH carrying jointly encoded ACK/NACK and CQI indication after about 7.5 slots according to the existing 3GPP specification 25.211 by taking the later received HS-PDSCH subframe as a reference. Wherein, 7.5 slots are for a timing correlation by which the UE transmits the HS-DPCCH subframe and correspondingly receives the HS-PDSCH subframe, which is specified in the existing 3GPP specification 25.211.

The above UE measures the frame timing information of the primary and secondary serving cells, and reports the measured result an RNC through signaling; and, after receiving the frame timing information of the primary and secondary serving cells reported by the UE, the RNC pairs the HS-PDSCH subframes of the primary and secondary serving cells according to the frame timing information, and notifies the UE of the pairing result of the HS-PDSCH subframes of the primary and secondary serving cells which are received by itself through signaling; and the UE respectively jointly encodes the ACKs/NACKs corresponding to each pair of HS-PDSCH subframes and the CQI indication corresponding to the primary and secondary serving cells according to the pairing result, and feeds back through the HS-DPCCH.

Figure 1:
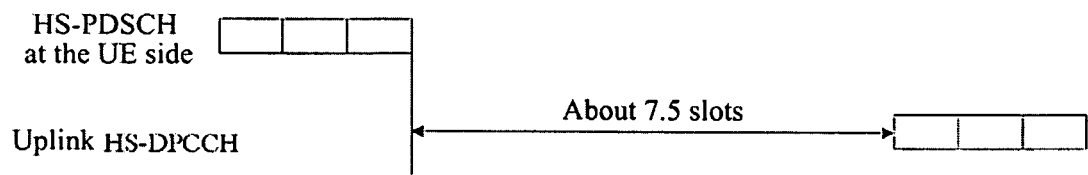
FIG. 1 is a timing diagram of the HS-DPCCH and the HS-PDSCH specified in the 3GPP specification 25.211.
Figure 2:
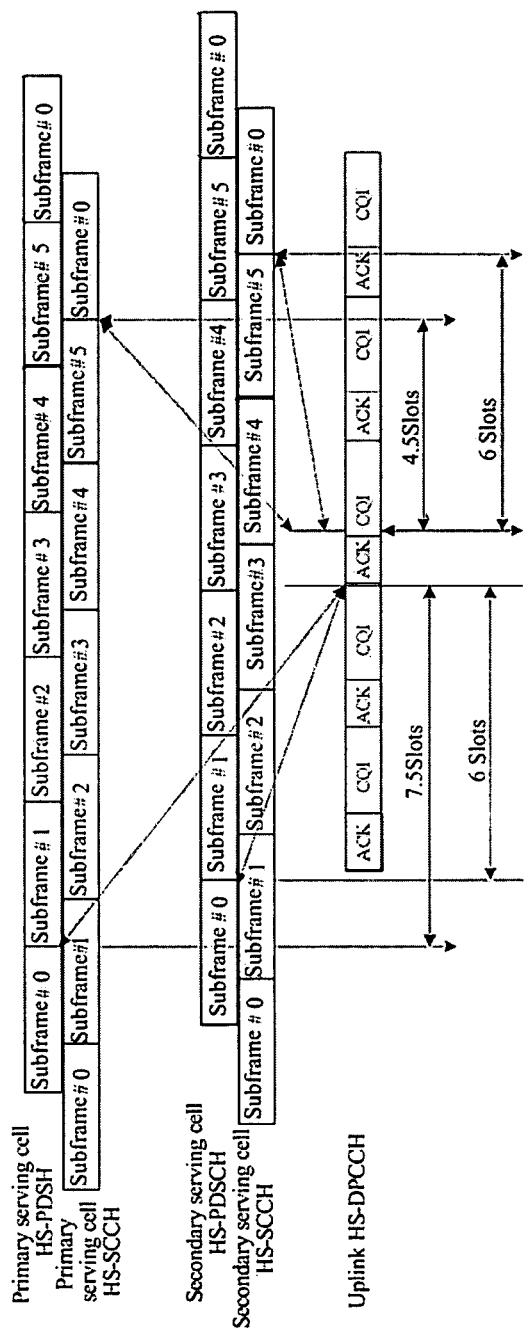
FIG. 2 is a diagram of a first scheme of the related technology.
Figure 3:
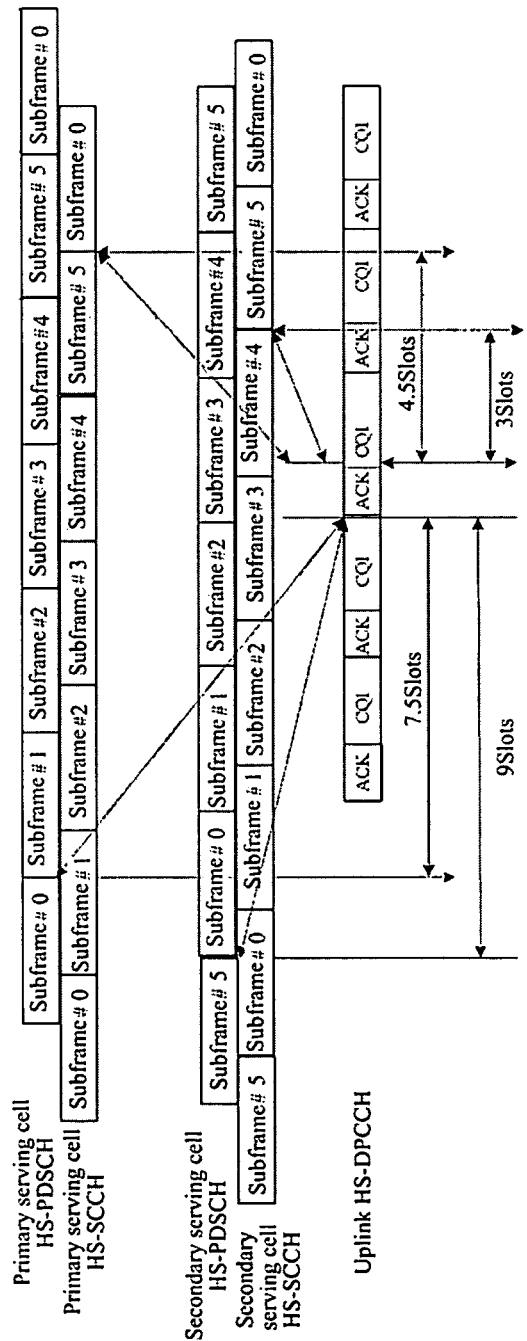
FIG. 3 is a diagram of a second scheme of the related technology.
Figure 4:
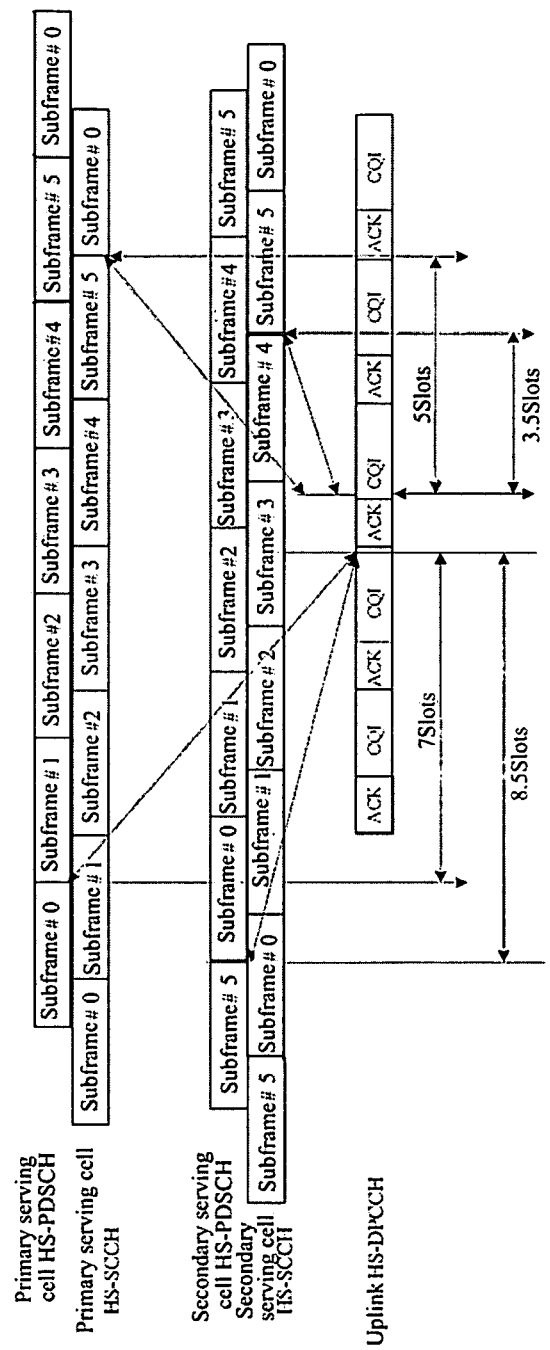
FIG. 4 is a diagram of a third scheme of the related technology.
Figure 5:
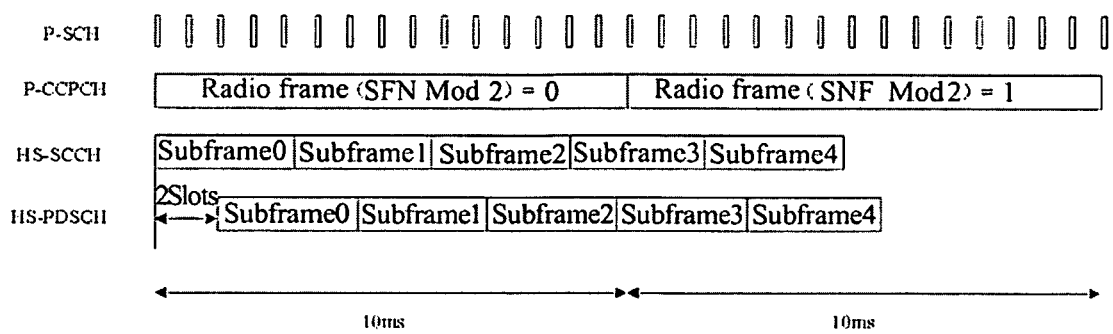
FIG. 5 is a timing diagram of an HSDPA related channel specified in the 3GPP specification 25.211.

When the pairing operation is performed specifically, the RNC can pair the HS-PDSCH subframe transmitted by the primary serving cell and the HS-PDSCH subframe transmitted by the secondary serving cell with a time offset being in a range of one subframe duration; or can also pair the HS-SCCH subframe transmitted by the primary serving cell and the HS-SCCH subframe transmitted by the secondary serving cell with a time offset being in a range of one subframe duration. As the time offset between the time when the HS-SCCH is transmitted and the time when the HS-PDSCH is transmitted is fixed (as shown in FIG. 5, the HS-SCCH frame is transmitted 2 slots ahead of the time when the HS-PDSCH subframe is transmitted), the RNC pairs the HS-PDSCH subframes of the primary and secondary serving cells, which is equivalent to pairing the HS-SCCH subframes of the primary and secondary serving cells, vice versa, and the pairing result is also the same.

In addition, when the multi-stream transmission capable UE activates the multi-stream transmission, the RNC can configure the numbers of HARQ processes of the UE in the primary and secondary serving cells to be any of 1-8, preferably, 6 or 7.

In order to make the UE which activates the multi-stream transmission have the opportunity to be scheduled continuously in each TTI, the network side (i.e., the RNC) can configure the numbers of HARQ processes of the UE which activates the multi-stream transmission in the primary and secondary serving cells to be more than 6 respectively; or in the paired HS-SCCH or HS-PDSCH subframes transmitted by the primary and secondary serving cells, configure the number of HARQ processes of the UE in the serving cell corresponding to the earlier received HS-SCCH or HS-PDSCH subframe to be greater than 6. Meanwhile, in order to enable the multi-stream transmission capable UE to achieve a higher peak rate when the multi-stream transmission is deactivated or is not activated, when the UE deactivates the multi-stream transmission, the network side can reconfigure the number of HARQ processes of the UE in the current serving cell to be less than 7 (considering that the SF-DC terminal may support the function of the DC), preferably 6; and when the UE does not activate the multi-stream transmission, the network side can configure the number of HARQ processes of the UE in the current serving cell to be less than 7 (considering that the SF-DC terminal may support the function of the DC), preferably 6. Meanwhile, in view of the multi-stream transmission capable UE only activates the multi-stream transmission in the cell edge region, in such cases, the channel quality of the UE will not be good, and even if there is a single UE in the cell currently, the UE can not achieve its theoretical peak value rate, and therefore, the UE which activates the multi-stream transmission needs not to consider supporting its theoretical peak value rate, and at this time, the performance requirements of the UE can also be satisfied even if the network side maintains to configure the number of HARQ processes of the UE to be 6 per serving cell.

Figure 6:
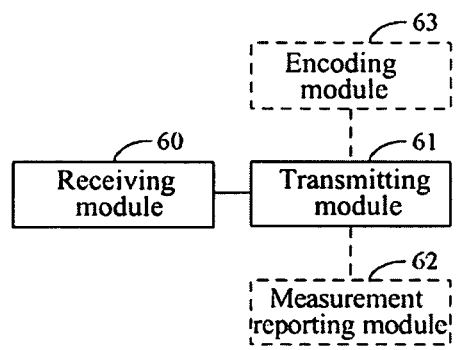
FIG. 6 is a structural diagram of a UE according to an embodiment of the present document.

Correspondingly, in the present embodiment, a UE, as shown in FIG. 6, comprises:

a receiving module 60 configured to receive HS-PDSCH subframes transmitted by primary and secondary serving cells when the UE activates a multi-stream transmission; and a transmitting module 61, configured to transmit an HS-DPCCH carrying jointly encoded ACK/NACK and CQI after a predetermined duration by taking the later received HS-PDSCH subframe of the pair of paired HS-PDSCH subframes as a reference, wherein the predetermined duration is determined according to a timing correlation by which the UE transmits the HS-DPCCH subframe and correspondingly receives the HS-PDSCH subframe, which is specified in the 3GPP specification 25.211.

Preferably, the UE further comprises:

a measurement reporting module 62, configured to report measured frame timing information of the primary and secondary serving cells to an RNC before the transmitting module transmits the HS-DPCCH; and the receiving module 60 is further configured to receive a pairing result sent by the RNC, which is obtained after pairing the HS-PDSCH subframe transmitted by the primary serving cell and the HS-PDSCH subframe transmitted by the secondary serving cell, wherein, the pairing result is obtained by the RNC according to received frame timing information of the primary and secondary serving cells which is reported by the measurement reporting module.

The UE can further comprise an encoding module 63, configured to:

obtain the jointly encoded ACK/NACK by jointly encoding the ACKs/NACKs corresponding to all subframes in the pair of paired HS-PDSCH subframes according to the received pairing result; and obtain the jointly encoded CQI after jointly encoding the CQIs corresponding to the primary and secondary serving cells.

The embodiments of the present document will be further described in detail in conjunction with accompanying drawings hereinafter.

Figure 7:
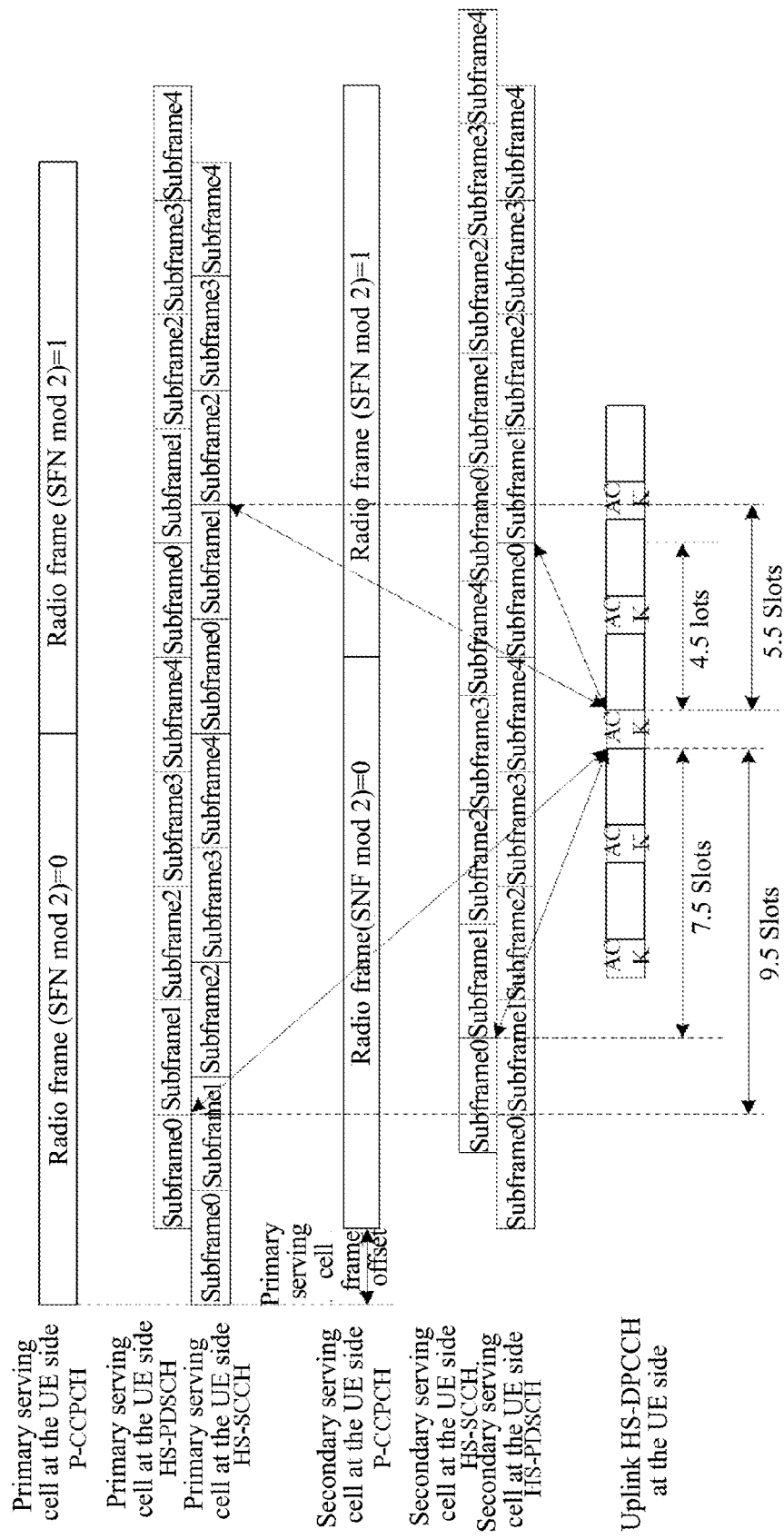
FIG. 7 is a diagram of a multi-stream transmission UE transmitting the HS-DPCCH and an NodeB processing according to an embodiment of the present document.

FIG. 7 is a timing diagram of a multi-stream transmission UE transmitting an HS-DPCCH and a serving NodeB decoding an ACK/NACK. It should illustrated that, the primary and secondary serving cells may be located under the same NodeB, or may also be located under different NodeBs, and therefore, without any special illustration, the serving NodeB hereinafter is a general term for the NodeBs to which the primary and secondary serving cells belong. In this figure, the frame boundary of the secondary serving cell is 2 slots later than the frame boundary of the primary serving cell, and at this time, the RNC pairs the HS-PDSCH subframe 0 of the primary serving cell and the HS-PDSCH subframe 0 of the secondary serving cell, pairs the HS-PDSCH subframe 1 of the primary serving cell and the HS-PDSCH subframe 1 of the secondary serving cell, and so on. The serving NodeB uses the $i^{th}$ HARQ process ($HARQ_i$) in the primary serving cell of the UE to schedule the UE in the HS-PDSCH subframe 0, and uses the $k^{th}$ HARQ process ($HARQ_k$) in the secondary serving cell of the UE to schedule the UE in the HS-PDSCH subframe 0. The UE receives the information of the HS-PDSCH subframe 0 of the secondary serving cell 2 slots later than receiving the information of the HS-PDSCH subframe 0 of the primary serving cell, therefore, the timing when the UE transmits the HS-DPCCH is benchmarked against receiving the HS-PDSCH subframe 0 transmitted by the secondary serving cell, and after receiving the HS-PDSCH subframe 0 transmitted by the secondary serving cell, the UE transmits the HS-DPCCH carrying the jointly encoded ACK/NACK and CQI indication again after about 7.5 slots according to the existing 3GPP specification 25.211. After the primary serving cell receives and decodes the HS-DPCCH transmitted by the UE, it can schedule the UE using the same $HARQ_i$ process in HS-SCCH subframe 2, and the interval between the UE being scheduled for the first time and the UE being scheduled for the second time on $HARQ_i$ is of 6 subframes (i.e., the scheduling period is of 7 subframes). After the secondary serving cell receives and decodes the HS-DPCCH transmitted by the UE, it can schedule the UE using the same $HARQ_k$ process in HS-SCCH subframe 1, and the interval between the UE being scheduled for the first time and the UE being scheduled for the second time on $HARQ_k$ is of 5 subframes (i.e., the scheduling period is of 6 subframes).

FIG. 8 is a diagram of one scheme of a primary serving cell scheduling a multi-stream transmission UE when the number of HARQ processes of the UE is configured to be 6 in FIG. 7, wherein the horizontal axis corresponding to "scheduled" represents that the TTI during which the UE can be schedule, the corresponding vertical axis represents a HARQ process number which can be used when the UE is scheduled. "Unscheduled" represents that the corresponding HARQ process number can not be used for scheduling the UE in the corresponding TTI. It can be seen from the figure that in 7 TTI periods, only one TTI is not used for scheduling the UE, i.e., subframe 6, and all other 6 TTIs can be used for scheduling the UE. It is sufficient to satisfy the scheduling requirements of the UE in the scene of multiple UEs existing in one cell, and in the scene of only that UE existing in one cell, the scheduling requirements of the UE can also be satisfied when 6/7 TTI periods can be used for scheduling, since the UE is at the cell edge.

FIG. 9 is a diagram of one scheme of a secondary serving cell scheduling a multi-stream transmission UE when the number of HARQ processes of the UE is configured to be 6 in FIG. 7; it is similar to FIG. 8, and will not be described here again.

FIG. 10 is a diagram of one scheme of a primary serving cell scheduling a multi-stream transmission UE when the number of HARQ processes of the UE is configured to be 7 in FIG. 7. It can be seen from the figure that in the 7 TTI periods, the primary serving cell can use a different HARQ process number to schedule the UE continuously.

FIGS. 11A and 11B are diagrams of two schemes of a secondary serving cell scheduling a multi-stream transmission UE when the number of HARQ processes of the UE is configured to be 7 in FIG. 7. Wherein, in FIG. 11A, the UE can be scheduled continuously only using 6 HARQ processes, and in FIG. 11B, the UE is scheduled continuously using 7 HARQ processes.

Figure 12:
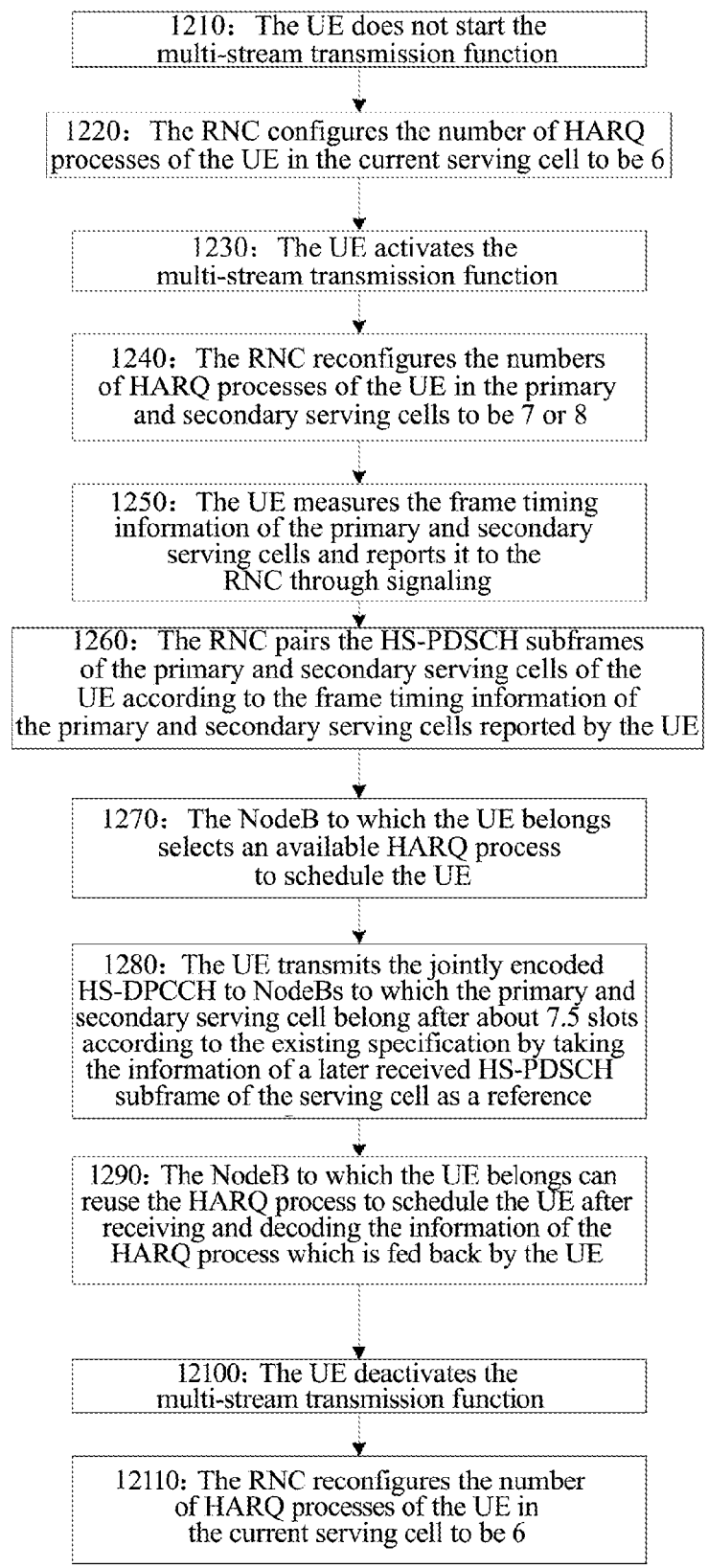
FIG. 12 is a flowchart of embodiment one of the present document.

As shown in FIG. 12, the steps of the procedure included in the present embodiment are as follows:

in step 1210, the UE does not start the multi-stream transmission function currently;

in step 1220, in order to enable the UE to be scheduled in each TTI and in order to enable the peak rate of the UE to be as high as possible, the RNC configures the number of HARQ processes of the UE in the current serving cell to be 6;

in step 1230, the UE activates the multi-stream transmission function;

in step 1240, in order to enable the UE to be scheduled in each TTI, the RNC reconfigures the numbers of HARQ processes of the UE in the primary and secondary serving cells to be greater than 6;

in step 1250, the UE measures the frame timing information of the primary and secondary serving cells and reports it to the RNC through signaling;

in step 1260, the RNC pairs the HS-PDSCH subframes transmitted by the primary and secondary serving cells of the UE according to the frame timing information of the primary and secondary serving cells reported by the UE, and sends the pairing result to the UE;

in step 1270, the serving NodeB selects an available HARQ process to schedule the UE;

in step 1280, the UE transmits the HS-DPCCH carrying the jointly encoded ACK/NACK and CQI indication to the serving NodeB after about 7.5 slots according to the existing 3GPP specification by taking the later received HS-PDSCH subframe as a reference.

in step 1290, the serving NodeB can reuse the HARQ process to schedule the UE after decoding the received HS-DPCCH which is fed back by the UE;

in step 12100, the UE deactivates the multi-stream transmission function; and in step 12110, in order to enable the peak rate of the UE to be as high as possible, the RNC reconfigures the number of HARQ processes of the UE in the current serving cell to be less than 7.

Figure 13:
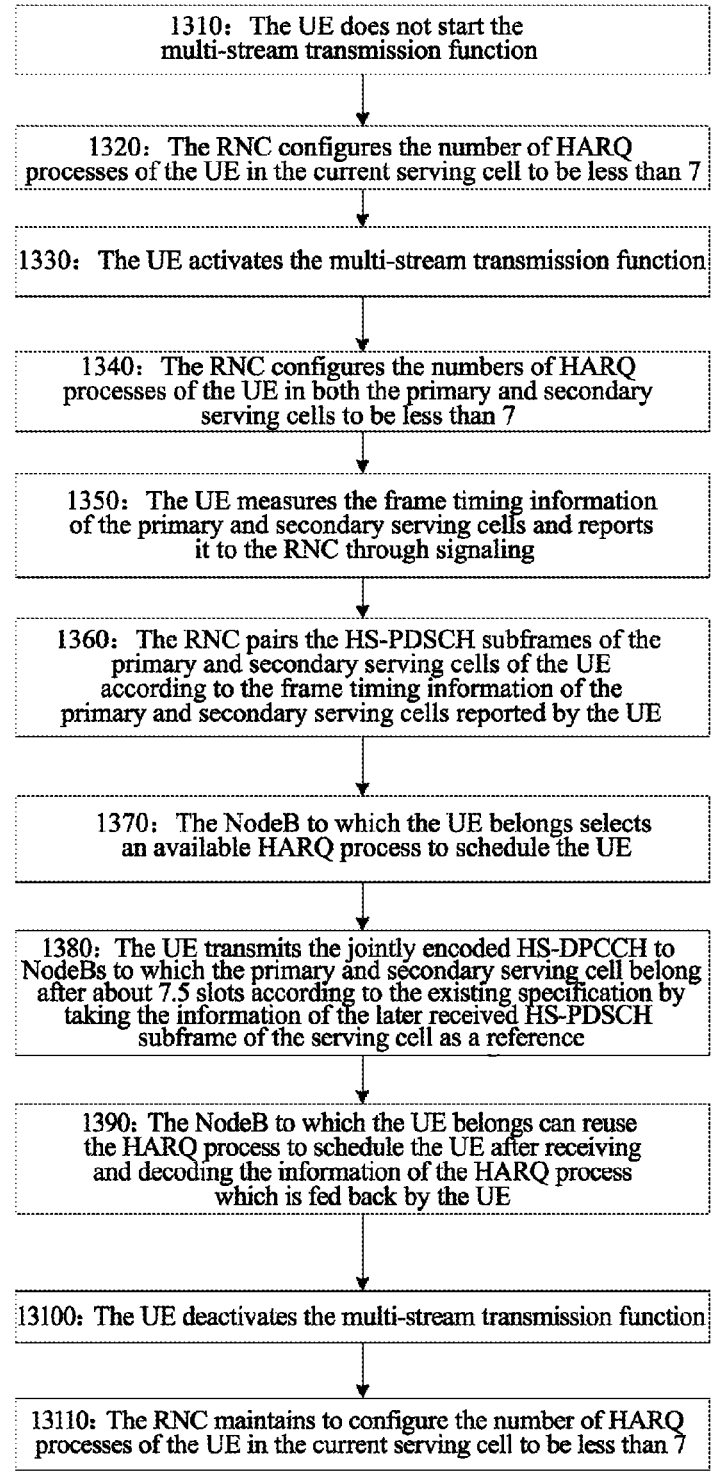
FIG. 13 is a flowchart of embodiment two of the present document.

As shown in FIG. 13, the steps of the procedure included in the present embodiment are as follows:

in step 1310, the UE does not start the multi-stream transmission function currently;

in step 1320, in order to enable the UE to be scheduled in each TTI and in order to enable the peak rate of the UE to be as high as possible, the RNC configures the number of HARQ processes of the UE in the current serving cell to be less than 7;

in step 1330, the UE activates the multi-stream transmission function;

in step 1340, the RNC configures the numbers of HARQ processes of the UE in both the primary and secondary serving cells to be less than 7; and as the number of HARQ processes for one of the primary and secondary serving cells has been configured in the above step 1220, in this step only the number of HARQ processes of the UE in the other serving cell is configured;

in step 1350, the UE measures the frame timing information of the primary and secondary serving cells and reports it to the RNC through signaling;

in step 1360, the RNC pairs the HS-PDSCH subframes transmitted by the primary and secondary serving cells of the UE according to the frame timing information of the primary and secondary serving cells reported by the UE, and sends the pairing result to the UE;

in step 1370, the serving NodeB selects an available HARQ process to schedule the UE, and at this time, there is one of the primary and secondary serving cells that can not schedule the UE in each TTI, and the UE can not be scheduled by the serving cell for at least ½ time, but this will not influence the performance of the UE;

in step 1380, the UE transmits the HS-DPCCH carrying the jointly encoded ACK/NACK and CQI indication to the serving NodeB after about 7.5 slots according to the existing 3GPP specification by taking the later received HS-PDSCH subframe as a reference.

in step 1390, the serving NodeB can reuse the HARQ process to schedule the UE after decoding the received HS-DPCCH which is fed back by the UE;

in step 13100, the UE deactivates the multi-stream transmission function; and in step 13110, in order to enable the peak rate of the UE to be as high as possible, the RNC maintains to configure the number of HARQ processes of the UE in the current serving cell to be less than 7. Since the configuration of the number of HARQ processes in the current serving cell of the primary and secondary serving cells is unchanged, this step may also not be performed.

A person having ordinary skill in the art should understand that all or part of the steps in the above method can be implemented by programs instructing related hardware, and the programs can be stored in a computer readable storage medium, such as a read-only memory, a disk, or a disc etc. Alternatively, all or part of the steps in the aforementioned embodiments can also be implemented with one or more integrated circuits. Accordingly, various modules/units in the aforementioned embodiments can be implemented in a form of hardware, or can also be implemented in a form of software functional modules. The present document is not limited to any particular form of combination of hardware and software.

The above description is only the preferred embodiments of the present document and is not intended to limit the protection scope of the present document. According to the inventive content of the present document, there can be many other embodiments, and without departing from the spirit and essence of the present document, those skilled in the art can make various corresponding changes and variations according to the present document, and any modification, equivalent substitution, improvement etc. which are made within the spirit and principle of the present document should belong to the protection scope of the present document.

INDUSTRIAL APPLICABILITY

On the premise of reusing the existing specification and having small modifications to the design of the UE, the embodiments of the present document solve the problem of the UE generating the ACK/NACK indication in the multi-stream transmission system, thus reducing the complexity of the design of the network system and the terminal, especially, reducing the implementation costs of the network system and the terminal.

What is claimed is:

1. A method for a User Equipment (UE) which activates a multi-stream transmission to transmit a High Speed Dedicated Physical Control Channel (HS-DPCCH), applied in a multi-stream transmission system, comprising:

the UE which activates a multi-stream transmission receiving High-Speed Physical Downlink Shared Channel (HS-PDSCH) subframes transmitted by a primary serving cell and HS-PDSCH subframes transmitted by a secondary serving cell, transmitting an HS-DPCCH carrying jointly encoded Acknowledge/Negative Acknowledgement (ACK/NACK) and Channel Quality Indicator (CQI) after a predetermined duration based on a later received HS-PDSCH subframe of a paired HS-PDSCH subframes which are paired with one of the HS-PDSCH subframes transmitted by the primary serving cell and one of the HS-PDSCH subframes transmitted by the secondary serving cell respectively, wherein the predetermined duration is determined according to a timing correlation by which the UE transmits an HS-DPCCH subframe and correspondingly receives an HS-PDSCH subframe, which is specified in the $3^{rd}$ Generation Partnership Project (3GPP) specification 25.211.

2. The method according to claim 1, further comprising:

before transmitting the HS-DPCCH, the UE reporting measured frame timing information of the primary serving cell and the secondary serving cell to a Radio Network Controller (RNC); and the UE receiving a pairing result which is obtained by the RNC through pairing the HS-PDSCH subframe transmitted by the primary serving cell and the HS-PDSCH subframe transmitted by the secondary serving cell, wherein, the pairing result is obtained by the RNC according to received frame timing information of the primary serving cell and the secondary serving cell which is reported by the UE.

3. The method according to claim 2, wherein, the pairing result is also transmitted to NodeBs corresponding to the primary serving cell and the secondary serving cell.

4. The method according to claim 2, wherein, the jointly encoded ACK/NACK is obtained after the UE jointly encodes the ACKs/NACKs corresponding to all subframes in a pair of paired HS-PDSCH subframes according to the received pairing result; and the jointly encoded CQI is obtained after the UE jointly encodes the CQIs corresponding to the primary serving cell and the secondary serving cell.

5. The method according to claim 2, wherein, a HS-PDSCH subframe transmitted by the primary serving cell and a HS-PDSCH subframe transmitted by the secondary serving cell with a time offset being in a range of one subframe duration are paired.

6. The method according to claim 1, further comprising:

when the UE has activated the multi-stream transmission function, both numbers of Hybrid Automatic Repeat Request (HARQ) processes of the UE in the primary serving cell and the secondary serving cell are configured by the RNC to be greater than 6, or a number of HARQ processes of the UE in a serving cell corresponding to an earlier received HS-PDSCH subframe in a pair of paired HS-PDSCH subframes is configured by the RNC to be greater than 6.

7. The method according to claim 1, further comprising:

when the UE deactivates the multi-stream transmission function, the number of HARQ processes of the UE in a current serving cell is reconfigured by the RNC to be less than 7.

8. The method according to claim 1, further comprising:

when the UE does not activate the multi-stream transmission function, the number of HARQ processes of the UE in a current serving cell is configured by the RNC to be less than 7.

9. A User Equipment (UE), comprising a processor, and a storage device for storing computer executable instructions, wherein a receiving module, performed by the processor, receiving High-Speed Physical Downlink Shared Channel (HS- PDSCH) subframes transmitted by a primary serving cell and HS-PDSCH subframes transmitted by a secondary serving cell when the UE activates a multi-stream transmission; and a transmitting module, performed by the processor, transmitting a High Speed Dedicated Physical Control Channel (HS-DPCCH) carrying jointly encoded Acknowledge/Negative Acknowledgement (ACK/NACK) and Channel Quality Indicator (CQI) after a predetermined duration based on a later received HS-PDSCH subframe of a paired HS-PDSCH subframes which are paired with one of the HS-PDSCH subframes transmitted by the primary serving cell and one of the HS-PDSCH subframes transmitted by the secondary serving cell respectively, wherein the predetermined duration is determined according to a timing correlation by which the UE transmits an HS-DPCCH subframe and correspondingly receives an HS-PDSCH subframe, which is specified in the $3^{rd}$ Generation Partnership Project (3GPP) specification 25.211.

10. The UE according to claim 9, further comprising:

a measurement reporting module, performed by the processor, reporting measured frame timing information of the primary serving cell and the secondary serving cell to a Radio Network Controller (RNC) before the transmitting module transmits the HS-DPCCH; and the receiving module further receiving a pairing result sent by the RNC, which is obtained by the RNC through pairing the HS-PDSCH subframe transmitted by the primary serving cell and the HS-PDSCH subframe transmitted by the secondary serving cell, wherein, the pairing result is obtained by the RNC according to received frame timing information of the primary cell and the secondary serving cell which is reported by the measurement reporting module.

11. The UE according to claim 10, further comprising an encoding module, performed by the processor, obtaining the jointly encoded ACK/NACK by jointly encoding the ACKs/NACKs corresponding to all subframes in a pair of paired HS-PDSCH subframes according to the received pairing result; and obtaining the jointly encoded CQI after jointly encoding the CQIs corresponding to the primary and secondary serving cells.

* * * * *